July 30, 1957     A. C. RUGE     2,801,388
EXTENSOMETER WITH ADJUSTABLE TEMPERATURE COMPENSATION
Filed Sept. 15, 1953     3 Sheets-Sheet 1
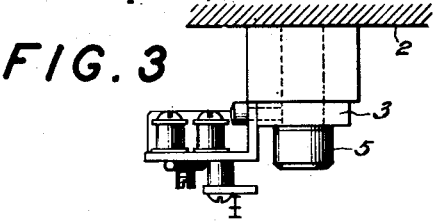
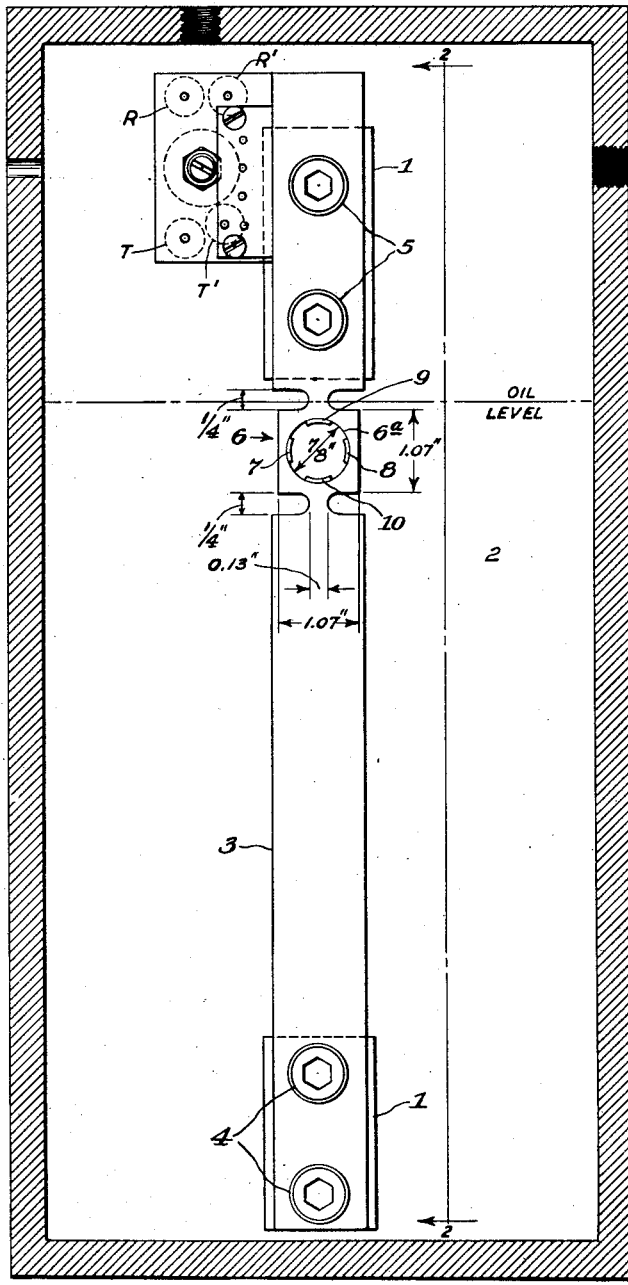
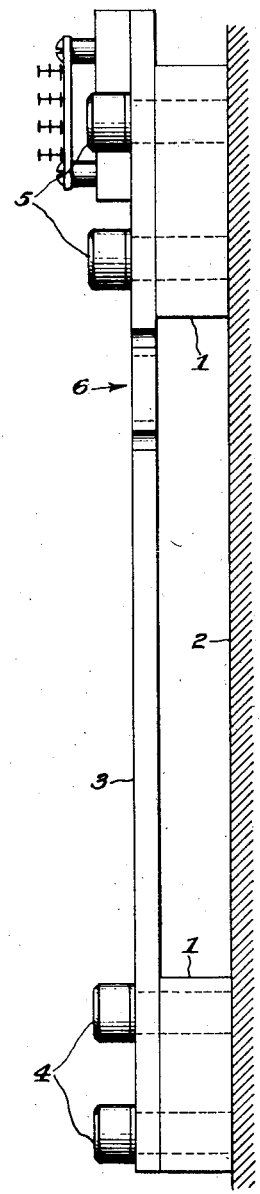
INVENTOR.
ARTHUR C. RUGE
BY
ATTORNEY July 30, 1957 — A. C. RUGE — 2,801,388
EXTENSOMETER WITH ADJUSTABLE TEMPERATURE COMPENSATION
Filed Sept. 15, 1953 — 3 Sheets-Sheet 2

INVENTOR
ARTHUR C. RUGE
BY
ATTORNEY

July 30, 1957 A. C. RUGE 2,801,388
EXTENSOMETER WITH ADJUSTABLE TEMPERATURE COMPENSATION
Filed Sept. 15, 1953 3 Sheets-Sheet 3
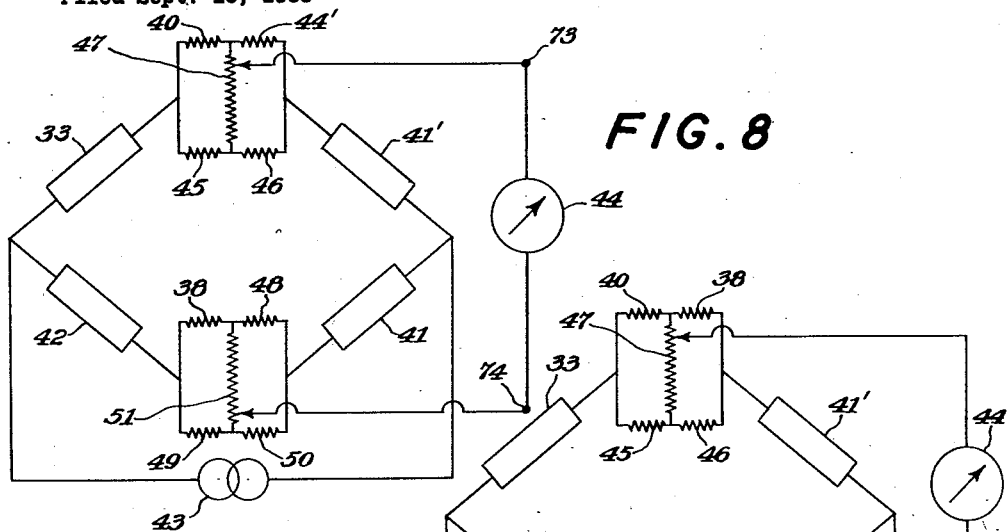
FIG. 8
FIG. 9
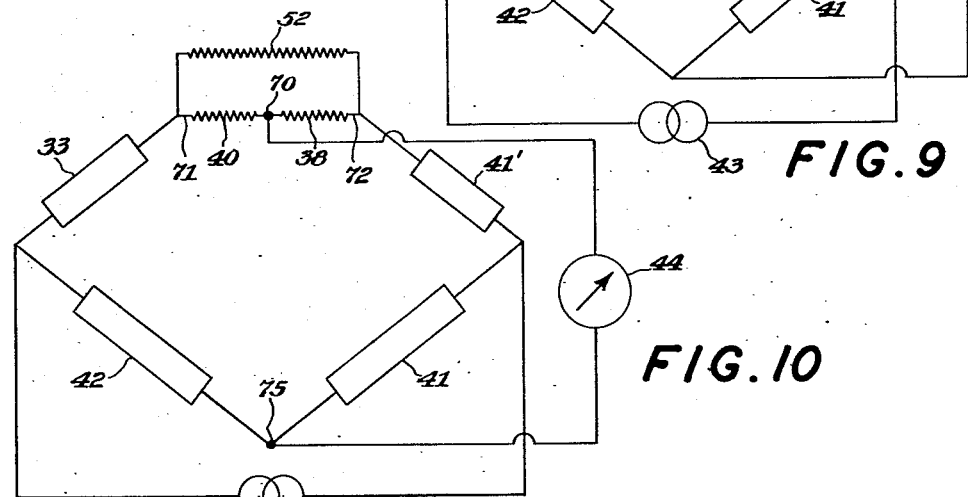
FIG. 10
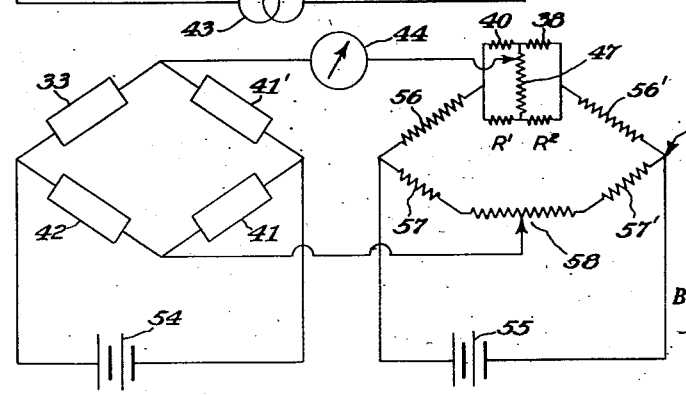
FIG. 11
INVENTOR.
ARTHUR C. RUGE
BY
ATTORNEY United States Patent Office 2,801,388
Patented July 30, 1957

2,801,388

EXTENSOMETER WITH ADJUSTABLE TEMPERATURE COMPENSATION

Arthur C. Ruge, Cambridge, Mass., assignor to Baldwin-Lima-Hamilton Corporation, a corporation of Pennsylvania Application September 15, 1953, Serial No. 380,178

4 Claims. (Cl. 324—62)

This invention relates generally to condition responsive electrical impedance apparatus such, for example, as extensometers, load cells, fluid pressure cells, etc.

One object of my invention is to provide condition responsive devices with novel means whereby the devices can measure to a high degree of accuracy and sensitivity and at the same time a plurality of temperature effects on the responsive devices can be conveniently and effectively compensated either at the device or remotely therefrom.

Another object is to provide an improved extensometer adapted to be attached to parts of machines or to members subject to strain by the provision of novel temperature compensation means whereby the temperature coefficient of expansion of the part or member to which it is attached can be compensated for after the extensometer is in place, even if the extensometer and the member to which it is attached are at different temperatures.

A further object is to provide an extensometer for such applications in which the strain to be measured is magnified without requiring mechanically moving parts and in which provision is made for adjustably compensating the extensometer so that it responds only to the stress-induced strains of the member to which it is attached in spite of changing temperature and in spite of the fact that the temperature coefficient of expansion of the member may be unknown and different from that of the extensometer itself.

Still another object is to provide means for adjustably compensating any impedance bridge against change in balance due to a plurality of temperature conditions regardless of the agency through which temperature affects the unbalance.

A still further object is to provide means for compensating an impedance bridge the balance of which is affected by different temperatures at different physical locations.

Another object is to provide improved means for making the output of an impedance bridge responsive to a predetermined function of a primary condition and a plurality of secondary conditions.

Other objects and advantages will be more apparent to those skilled in the art from the following description of the accompanying drawings in which:

Fig. 1 is a front elevation of an extensometer embodying the principles of my invention;

Figs. 2 and 3 are respectively side and plan views of the extensometer shown in Fig. 1;

Fig. 8 is a bridge-within-a-bridge circuit for the load cell shown in Fig. 7;

Fig. 9 is a simplified circuit over that shown in Fig. 8;

Fig. 10 is another simplified circuit over that of Fig. 8 in which the adjustable features of the Fig. 8 circuit have been eliminated; and Fig. 11 is a two-bridge circuit arrangement in which the bridges are external of each other.

Figure 5:
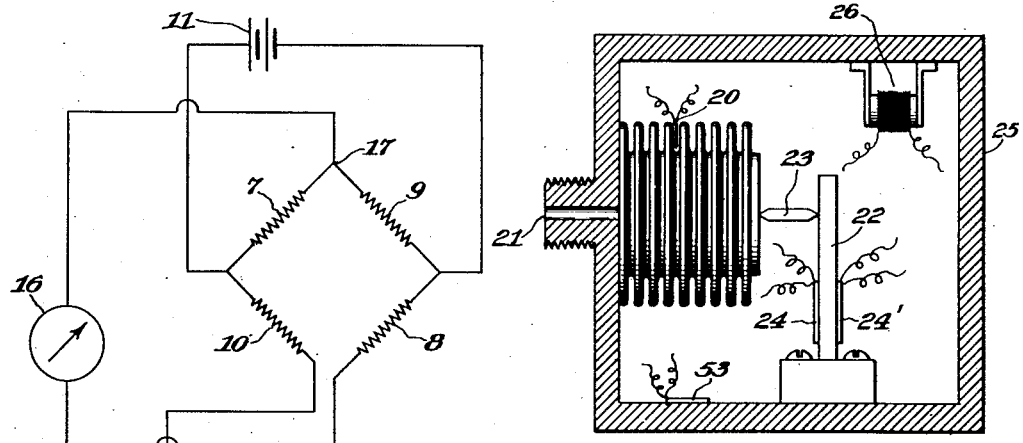
Fig. 5 is a diagrammatic bellows and beam pressure cell enclosed in a sealed case within which is a temperature sensitive resistor which forms one element of my improved temperature compensating combination.

One example used for purposes of illustration in this disclosure is a rolling mill extensometer which is adapted to be attached to the housing of a rolling mill for the purpose of determining the amount of rolling pressure as it is reflected in terms of induced strain in the housing of the mill. It will readily be seen that many other applications of the extensometer are practical such as measuring of the load carried by a large tank or bin by placing an extensometer on some structural member whose stress depends upon the load to be measured. It will also be seen that the compensating features of the invention are applicable to a wide variety of impedance bridge networks.

Now it is characteristic of many applications such as the rolling mill extensometer that the load-carrying members are very lightly stressed under normal loading conditions with the result that an accurate measurement of the strain becomes difficult. In the rolling mill housing, for example, the load-carrying structure is very much "over designed" for the reasons that the machinery has to be extremely rugged to withstand the service as would be found in a metal rolling mill. Also, the rolling mill including the housings must be as rigid as possible to reduce distortions and deflections to the point where the required tolerances on the finished product can be maintained.

In addition to the low stress level which of itself makes an accurate strain measurement difficult, the effect of temperature can and frequently does make it still more difficult to achieve accurate measurement. The reason is that the thermal expansions and contractions of the stressed member may easily be of the same order as or higher order of magnitude than the stress-induced strain. A hot rolling mill for rolling steel is a good example of this, combining as it does wide swings in temperature with a very low stress at normal working loads.

In the case of such an extensometer, the agency through which temperature affects the balance of the condition responsive impedance bridge may be the differential expansion between the body of the extensometer and the member to which it is attached. The agency may also be imperfect compensation of the impedance bridge itself as may be caused by lack of symmetry of temperature characteristics of the bridge arms, or by one portion of the bridge circuit being at a different temperature from the remainder of the bridge circuit.

In an extensometer of the type described in the following disclosure, the body of the extensometer and the member to which it is attached may be at different temperatures. In such a case, the unbalance of the bridge is normally affected by both of the temperatures. Another example is a load or pressure sensing device in which the sensing element is acted upon as a result of differential expansion to produce a temperature error when two or more parts of the structure are at different temperatures.

In Fig. 1, I show an application of this invention to an extensometer which has been successfully applied to measurement of rolling forces in steel rolling mills. Upper and lower pads or bosses 1 are attached to the rolling mill housing 2 and spaced apart in the direction in which strain is to be measured. An extensometer, comprising a long integral flat bar 3, is firmly attached to the pads by screws 4 and 5 so that its ends are forced to undergo any relative movement that takes place between the upper and lower pads 1, 1. Interposed between and attached to the ends of extensometer 3 is a motion-responsive member 6 to which is transmitted the relative motion between the pads 1, 1 in the axial direction of the extensometer.

Although I could use in place of member 6 any other type of motion-responsive device in which a change of electrical impedance takes place in response to applied motion, I prefer to employ a device in which the motion to be measured is translated into a surface strain which actuates a bonded wire resistance strain gage since such a device is extremely simple both electrically and mechanically, and since it is capable of giving a high sensitivity and accuracy of response. In the preferred embodiment of my invention member 6 has a circular hole 6a forming a ring-shaped member similar to that disclosed in my Patent No. 2,561,318, the principal difference being that here I employ the device to measure a motion rather than a force or load directly. The member 6 is preferably cut from the same extensometer bar 3, thus reducing the manufacturing operation to a simple milling and boring job. Obviously, the extensometer need not be integral as I have shown it, but the integral construction has certain advantages from the standpoint of manufacture and assembly.

Bonded wire strain gages 7, 8, 9, 10 are attached to the inside surface of the hole 6a so as to afford maximum response to motion applied to it by the strains in the mill housing 2. It is seen that by making the ends of member 3 ample in cross section substantially all of the relative motion between the upper and lower pads 1 is transmitted directly to motion-sensing element 6 with the result that by suitable proportioning of member 6 and the overall length of the extensometer I can achieve a magnification of strain at gages 7, 8, 9, 10 relative to the strain in the housing to which the extensometer is attached.

It is well known in the art how we can utilize the changing resistance of strain gages such as 7, 8, 9, 10 to measure the motion impressed on member 6 and it is clear that the device can be calibrated in terms of actual load on the structure if desired.

This leads us to the problem of temperature compensation which will now be explained. Still taking the rolling mill application as an example, it will be recognized that the thermal coefficient of expansion of the housing metal (which may be a cast steel) is generally not known accurately by the builder of the extensometer—indeed, it is normally not known by anyone except within rather broad limits because it is a function of the exact composition of the metal and many other factors such as the grain structure. Without the invention which is to be disclosed herein, the best the designer of the extensometer could do would be to make extensometer 3 out of a material which is believed to be similar in its thermal expansion coefficient to that of the member to which it is to be attached and hope for the best. In my present invention I provide means responsive to the temperatures of the mill housing and the extensometer and incorporate them in my electrical circuit in such a way that the user of the extensometer can by a simple adjustment make its response substantially independent of relative movements that take place between the pads of Fig. 1 as a result of thermal expansion or contraction of the mill housing and extensometer while still responding with full sensitivity to the relative motion between these same pads which exists as a result of stress-induced strain in the housing.

Figure 7:
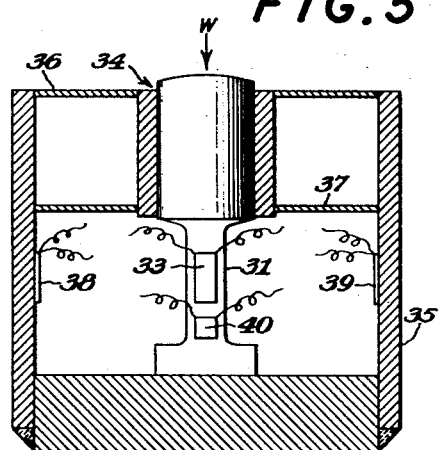
Fig. 7 shows schematically a load cell to which the principles of my invention have been applied.
Figure 4:
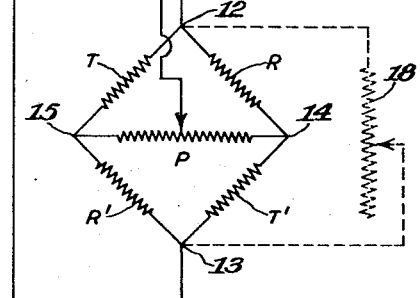
Fig. 4 is a preferred circuit embodiment of the invention in the form of a bridge-within-a-bridge.

In Fig. 4, in order to explain the principles of my invention I show a "bridge-within-a-bridge" type of circuit. The main bridge is comprised of strain gages 7, 8, 9, 10 of Fig. 1. This bridge is energized by a source of power 11 indicated here as a battery. One output corner of the bridge is open and a second bridge comprising elements T, T', R, R', is inserted and connected as shown, two of the corners 12 and 13 being in series with main bridge arms 8 and 10 while an adjustable voltage divider P is connected across corners 14 and 15 and an indicator 16 for detecting unbalance of the circuit is connected across the slider of voltage divider P and the other output corner 17 of the main bridge. Resistors T and T' which are preferably but not necessarily made equal are made of a temperature-sensitive material such as nickel wire, while resistors R and R' which are also preferably made equal are substantially non-responsive to temperature or at least considerably less so than resistors T and T'. Temperature-sensitive elements such as T, T' may be wound on spools and located in the area where the temperature is the same as that of the part whose temperature is to be sensed, or for more precise results they may be bonded to the part as indicated in Fig. 7 so that they will follow the true temperature of the part in question. Such bonded temperature-sensitive elements are currently marketed under the trade name "RdF Stikon" manufactured and sold by Ruge-de Forest Inc., of Cambridge, Massachusetts. These resistors may be located as shown in Fig. 1 where they are for convenience attached to the extensometer itself for ease in installation provided that the extensometer and mill housing are both at substantially the same temperature. It is, of course, important that they be so located that resistors T, T' follow substantially the temperature of the member on which the extensometer is mounted, here assumed to be the same as the temperature of the extensometer.

As a practical matter, the entire extensometer is housed in a rugged protective casing 17a which at the same time serves to maintain the extensometer substantially at the same temperature as the rolling mill frame. To further help keep the extensometer and the rolling mill housing at the same temperature, the protective case or cover is preferably partially or totally filled with a fluid such as oil and the case may be provided with thermal lagging if the ambient conditions are particularly severe. To obtain truly precise compensation, however, the resistor T, for example, is installed in intimate contact with extensometer 3 while resistor T' is installed in intimate contact with the rolling mill housing adjacent to the extensometer, employing them in such circuits as described in connection with Figs. 8, 9, 10, thus making the compensation fully effective even though housing 2 and extensometer 3 are not at the same temperature.

If the bridge-within-a-bridge of Fig. 4 has been constructed as above described, it may be seen that the following holds true. With voltage divider P set at its middle position, a given change of temperature of both resistors T and T' (T and T' being assumed identical for purposes of explanation) will have no effect on unbalance indicator 16 since the effect of change of resistance of one will exactly offset the effect of change of resistance of the other. If the voltage divider is moved to one of its extreme positions it will be seen that a change of temperature of resistors T and T' will cause indicator 16 to move in one direction, but if the voltage divider is adjusted to its other extreme position the same change of temperature will cause the indicator 16 to move in the opposite direction. The effect of this bridge-within-a-bridge is, therefore, to provide an artificial temperature coefficient to the extensometer which can be adjusted continuously from a desired positive value to a desired negative value. This artificial temperature coefficient can be used to correct for any difference in thermal expansion coefficient between the extensometer and the member to which it is attached. It can also be used to correct for any accidental lack of thermal compensation in the strain gage measuring circuit itself. If therefore has much broader use than is described in this specific illustration.

If we suppose that the extensometer 3 and the rolling mill housing 2 have exactly the same thermal coefficients of expansion and if we assume that the principal bridge 7, 8, 9, 10 is not itself responsive to temperature, then it may be seen that the slider of voltage divider P would be set exactly in the middle, resistors T and T' being assumed to be equal and alike. If, on the other hand, the extensometer and the member to which it is attached have different thermal coefficients of expansion, voltage divider P is merely adjusted one way or the other from the center position depending upon which has the larger thermal expansion coefficient, until the device is suitably adjusted to be non-responsive to the effect of temperature. The voltage divider P can be readily calibrated if desired so that the field adjustment is made by merely observing the indicating or recording instrument 16 at two different temperatures with no load applied to the structure and moving the slider of P by an amount determined by the known observation temperatures and the manufacturer's calibration of the divider. Or, the adjustment can be made by "cut-and-try" very much as one adjusts the rate of a clock without benefit of a calibrated "fast-slow" adjustment.

Referring again to Fig. 4, I can adjust the range of the temperature compensation by use of a variable shunt 18 placed across terminal 12, 13. With this refinement, I can make the adjustment of voltage divider P as coarse or as fine as I need, depending upon actual operating conditions which may not have been known beforehand. Of course, shunt 18 can be a fixed impedance if the range of adjustment, once found, does not need to be varied.

Still referring to Fig. 4, if range of the temperature compensation adjustment in the positive and negative directions must be different, then arms T and T' are made correspondingly different, as will readily be seen from an analysis of the effect of temperature on bridge balance when the slider of voltage divider P is placed first at position 14 and then at position 15.

Figure 6:
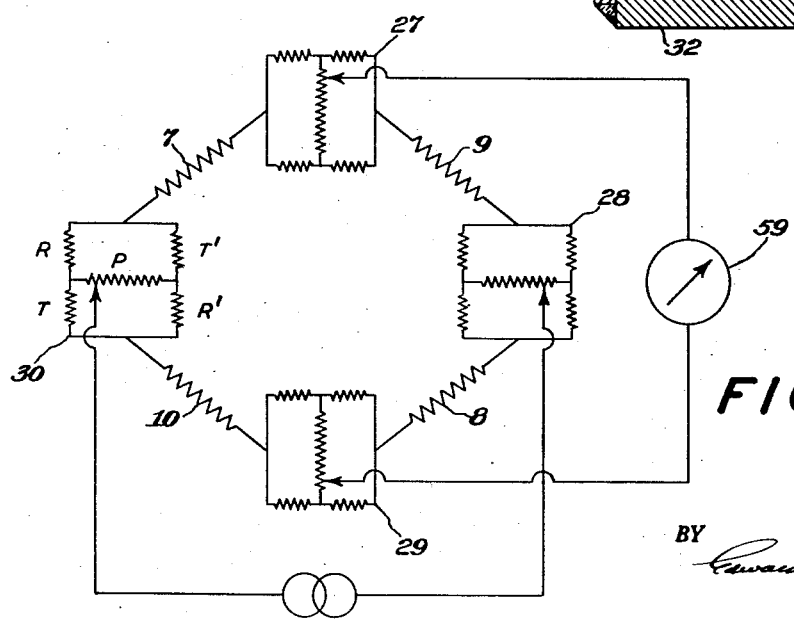
Fig. 6 is a modification of the circuit shown in Fig. 4.

A further modification of Fig. 4 is shown in Fig. 6 which illustrates two important features of the invention: (1) the bridge-within-a-bridge can be placed in any corner of the main bridge; and (2) the invention can be used to provide multiple compensation for a plurality of conditions or temperatures which may be at more than one location and which affects the balance of the main bridge. For simplicity I have shown the same numbers as used in Fig. 4 where parts perform identical functions. Bridge corners 27, 28, 29 are similar to corner 30 and one or more of them may be employed, depending upon the compensation requirements. The values of the fixed and temperature responsive elements and the voltage dividers may vary from corner to corner, depending upon the nature of the compensation, as has been fully explained above. In each corner that is used in the bridge there is at least one condition responsive arm which in the case of the extensometer varies with some temperature condition which affects the balance of the bridge. As one example of how such a multiple compensation may be required, consider the case where two or more arms of a bridge must by the nature of the measuring problem be subjected to different temperatures, each arm having some response to temperature which it is desired to compensate for so that the bridge measures only the desired condition which may, for instance, be a load or fluid pressure. Elements T and/or T' in corner 30 may, for example, measure the temperature to which arm 7 is subjected, etc. Voltage divider P would then be adjusted so as to compensate for the effect of temperature on arm 7 alone and similar adjustments would be made at other corners as needed for the other arms of the bridge as required.

Or, the bridge as a whole may be acted upon by temperatures at more than one location as will be exemplified in the case of the load cell shown in Fig. 7 to which the principles of the present invention have a particularly valuable and practical application. Fig. 7 represents schematically a load cell of the general class covered by my Patent No. 2,472,047. The load sensitive element 31 is supported on a base 32 to transmit an applied load W and is equipped with one or more bonded wire strain gages 33 to sense the load in conventional manner. To support element 31 against lateral and eccentric load it is guided by a piston 34 which engages an outer shell 35 through diaphragm means 36, 37, shell 35 being suitably welded or otherwise attached to base 32 to provide the necessary strength against such loading.

In building such devices as that shown in Fig. 7 it is customary to temperature compensate the bridge containing the sensing gage 33 so that when the entire cell is subjected to a uniform change of temperature the unbalance of the bridge is substantially unaffected thereby. This can be done to a high degree of accuracy but in all prior art it has been necessary that the entire cell be brought to a uniform temperature before perfect compensation takes place.

Now consider the case where the cell is subjected to a change in temperature and where it has not had time to come to a thermal equilibrium. For instance, the ambient air temperature may suddenly change, or the outer case of the cell may be subjected to radiant heat as from sunshine or the exhaust of a jet engine, or it may be suddenly rained upon in an outside location. During such a change a transient lack of temperature compensation results from the fact that differential expansion exists between the case 35 and sensitive member 31, causing diaphragms 36, 37 to produce forces on element 31 which are not related to the force W to be measured. By employing a temperature sensing element 40 (or a number of such elements distributed as needed over element 31) we can compensate for temperature effects on element 31 in accordance with the principles of the invention. In Fig. 8, I have shown a suitable bridge circuit in which one arm 33 represents the strain gage shown in Fig. 7. The other arms 41, 41', 42 may be strain gages or other suitable impedance devices to complete the bridge circuit. The bridge is energized by voltage source 43 and the unbalance indicated by unbalance indicator 44.

In the upper output corner of the bridge I have shown temperature sensitive resistor 40 of Fig. 7 as an element of my bridge-within-a-bridge. For purposes of explaining the action I assume throughout that the temperature sensitive resistors referred to have positive temperature coefficients, although it will be clear that I can use negative coefficient resistors by obvious modifications of the circuits. The other arms of the bridge-within-a-bridge are for simplicity taken to be fixed resistors indicated as 44', 45, 46. Adjustable voltage divider 47 is connected to one terminal of indicator 44 to provide adjustable temperature compensation against expansion and contraction of element 31 of Fig. 7. It may be seen that for the case of Fig. 7 only one element 40 will suffice in the bridge-within-a-bridge at the top of Fig. 6. This is because the direction of the necessary compensation is not reversible. If element 31 expands due to increase of temperature, the diaphragms 36, 37 act to produce a compressive load on element 31 which decreases the resistance of strain gage 33. Therefore, element 40 must be so placed in the bridge-within-a-bridge of Fig. 8 that when it increases temperature it will offset the resistance decrease experienced by strain gage 33. It is only necessary therefore to make element 40 somewhat larger than is actually necessary—then, if the slider of voltage divider 47 is moved to the top of the bridge-within-a-bridge of Fig. 8 the device overcompensates for the effect of temperature on member 31 of Fig. 7, whereas when the slider is moved to the bottom of the same divider there is no compensation applied.

I can, of course, use another resistor such as 40 in place of fixed resistance 46 of Fig. 8 if I wish to make the adjustment go through a change of algebraic sign as the slider moves from one end to the other. This I might wish to do in case the main bridge 33, 41, 41', 42 is itself not fully temperature compensated and I might not know in advance whether the overall lack of compensation is positive or negative.

Now coming to the compensation for effect of temperature on shell 35, I have indicated at the lower output corner of the bridge of Fig. 8 another bridge-within-a-bridge, one arm of which is indicated as temperature sensing element 38 of Fig. 7. Or, the arm 38 in Fig. 8 might be made up by a combination of elements such as 38, 39 of Fig. 7 taken in series or parallel as convenient. The other arms of the bridge-within-a-bridge are preferably fixed resistors indicated as 48, 49, 50. An adjustable voltage divider 51 is connected across the output terminals of this bridge-within-a-bridge, the slider being connected to the remaining terminal of unbalance indicator 44. Since an increase of temperature of shell 35 will produce a tension in element 31, thus increasing the resistance of strain gage 33, it may be seen that I have located element 38 in the bridge of Fig. 8 so that when it increases temperature it acts in a contrary direction and therefore provides proper compensation. By making element 38 larger than is necessary it is possible therefore to adjust the exact desired compensation by suitable positioning of the slider of potentiometer 51.

It is clear that the structure shown in Fig. 7 comes under the class of a responsive device the output of which is affected by a plurality of temperature conditions which exist at more than one location. To a very close degree of approximation, only two temperatures are significant: (1) the temperature of the sensing member 31 and (2) the temperature of the outer shell 35. Normally, the temperature of member 31 is sufficiently uniform around its periphery and along its length that a single temperature sensing element 40 is adequate for providing the desired compensation due to expansion or contraction of that member. However, obviously more than one such temperature sensing element can be employed in order to arrive at the average temperature of member 31. In the case of the outer shell 35, however, the temperature around the periphery may not be uniform, particularly where radiant energy falls upon the load cell. Therefore, it may be desirable to employ more than one element 38, 39, suitably spaced around the periphery in order to sense the average temperature of the shell 35. Preferably series and/or parallel connection of such elements is used to obtain the average temperature.

It may be seen that, if the main bridge 33, 41, 41', 42 is perfectly compensated of itself against changes of temperature (assuming the entire load cell of Fig. 7 is maintained at uniform temperature throughout), the circuit of Fig. 8 can be proportioned so as to be responsive only to differences in the temperatures of elements 38 and 40 and non-responsive when they are at the identical temperature. This makes possible a simplification in circuitry over that shown in Fig. 8. Such simplified circuit is shown in Fig. 9 which again relates to elements shown in Fig. 7 and is numbered identically wherever identical elements can be used. I here show only one bridge-within-a-bridge, but I make two adjacent arms of this inside bridge of elements 38 and 40, the remaining arms 45 and 46 being fixed resistors as before. Now, if the characteristics of temperature sensing elements 38 and 40 are properly chosen relative to the impedance of bridge arms 41' and 33 respectively, it may be seen that the amount of temperature compensation introduced by adjustment of voltage divider 47 will depend only upon the differential temperature existing between elements 38 and 40 and not at all upon their absolute temperatures.

The embodiment shown in Fig. 9 is obviously simpler than that of Fig. 8 and accomplishes the identical result. The only limitation is that to be completely effective, the values of 38 and 40 in Fig. 9 must be properly proportioned relative to arms 41' and 33 of the main bridge, whereas in the case of the embodiment shown in Fig. 8, since I have provided two independent adjustments it is clear that the magnitudes of elements 38 and 40 do not need to be precisely fixed relative to any of the bridge arms. The significant is that in an experimental setup the arrangement of Fig. 8 would be highly advantageous. In a production manufacturing setup however, it is a simple matter to maintain the necessary tolerances to make the simpler arrangement of Fig. 9 practical.

Furthermore, in the case of a production manufacturing operation it is practical to eliminate the adjustable feature of the Fig. 9 embodiment. Therefore, in Fig. 10, I show a special case which I can employ successfully in a production device such as the load cell shown in Fig. 7 in which I do not use any adjustable features. Again, like parts in Fig. 10 are numbered the same as in Figs. 7, 8, and 9.

In Fig. 10, I employ temperature sensitive elements 38, 40 which are properly proportioned to bridge arms 41' and 33 respectively. Unbalance indicator 44 is non-adjustably connected to the junction of elements 38 and 40. By "properly proportioned" I mean, assuming for purposes of illustration that elements 38 and 40 have equal temperature coefficients of resistance and assuming the coefficients of linear expansion of elements 31 and 35 are the same, the ratio of the resistance of element 38 to bridge arm 41' would be the same as the ratio of the resistance of element 40 to bridge arm 33. Then, if both elements 38 and 40 are brought to the same temperature they will produce no net effect on the indication of unbalance indicator 44.

If desired, I can make elements 38 and 40 larger than actually needed and employ a fixed shunt 52 across them to bring the compensating effect down to the desired amounts. This has the advantage that I can determine a value for shunt 52 after the entire assembly is otherwise completed which gives me much more latitude in tolerance of the resistance and coefficients of elements 38 and 40. I could use separate shunts around each of elements 38 and 40, but I prefer the single shunt 52 for reasons of economy except where it is necessary to predetermine the contributions of elements 38 and 40 independently of each other.

Another example where such double or differential temperature compensation would be of value would be in a structure such as the pressure cell of Fig. 5. I could use one temperature sensing element to measure the temperature of bellows 20 and another to measure the temperature of the region 53 of case 25. Applying these two sensing elements as has been described in connection with Figs. 8, 9, and 10 it will be seen that I could compensate for errors which would otherwise be due to differential expansion such as might result, for example, if a hot fluid is injected into bellows 20 while case 25 in region 53 is maintained at a cool temperature.

While I have throughout referred to the compensation of a single bridge by means of temperature sensing elements connected into the bridge, it is to be understood that the principles of this invention can be applied much more broadly. For example, it is customary in the instrument art to employ multiple bridge arrangements in which one or more bridges are responsive to the condition to be measured while an additional bridge is used to perform the measuring function. When such an arrangement is employed, I can place the compensating network in a corner of any of the bridges as may be most convenient. For some applications it may be more convenient to perform the compensating function in the measuring bridge which is located in or at the indicating instrument rather than putting it in one of the condition responsive bridges. In order to make clear the use of a multiple bridge setup, I show in Fig. 11 a two-bridge arrangement which can be substituted for such an arrangement as that shown in Fig. 9. Like parts are numbered alike for convenience. The condition responsive bridge 33, 41, 41', 42 is now a simple Wheatstone bridge and has its output opposed to the output of measuring bridge indicated generally at 53, the net unbalance between the two bridges being indicated by unbalance indicator 44. The bridges are separately powered by power sources 54, 55 which may be either A. C. or D. C. Measuring bridge 53 comprises four impedances 56, 56', 57, 57' and a balancing slide wire potentiometer 58 which is used to bring indicator 44 to null and thus provide a measurement of the unbalance of the condition responsive bridge. In one corner of bridge 53, I place one or more temperature responsive elements 38, 40 in a bridge-within-a-bridge and take off an adjustable amount of temperature compensation by means of potentiometer 47.

Thus it will be seen that in one broader sense of the invention I provide means for introducing an adjustable temperature responsive output to a bridge, said temperature responsive output being superimposed upon the output the bridge would have when taken by itself. It is therefore seen that it is not necessary that my invention perform a compensating function, although that is perhaps the most obvious use it can be put to. In the case illustrated in Fig. 11 the arrangement actually produces a deliberate lack of compensation in the measuring bridge in order to offset the lack of compensation in the condition responsive bridge. In another case, it may merely be desired to add one or more temperature or other condition responsive functions to the output of a bridge without any consideration related to compensation. For instance, in Fig. 6 the main bridge might be responsive to fluid pressure $P_1$ and we may wish to make the indicator 59 represent a function output $$= P_1 + a_1 t_1 + b_1 t_2 + \ldots$$

in which $t_1$ and $t_2$ may be temperature changes and the coefficients $a_1$ and $b_1$ may be different in magnitude and algebraic sign, and for which suitable adjustment is required as shown in Fig. 6 at one or more corners.

In all of the embodiments described above it will be seen that there are certain common basic features. In each case I employ an impedance bridge network which has two input and two output terminals and which includes at least one impedance element which is responsive to a primary condition such as the impedance element 33 of Fig. 7 which is responsive to the load induced strain in element 31 and which is connected into an impedance bridge network such as illustrated in Figs. 8–11 inclusive. In all cases I supply a source of power which serves to energize the bridge network through its input terminals.

A further basic provision of all the embodiments of this invention is a plurality of secondary impedance means each of which is respectively electrically responsive to a given secondary condition. Such means are elements 38 and 40 in Fig. 7, for instance, which are electrically responsive to the respective temperatures prevailing at their locations in the load cell. Next, I provide means for electrically connecting the plurality of secondary impedance means to the bridge network so that the overall output of the network is responsive to all of the primary and secondary conditions. The connecting means in the case of Fig. 8 would be the "bridge-within-a-bridge" arrangements which serve to connect secondary condition responsive elements 38 and 40 into the primary bridge 33, 41, 41', 42. Thus, element 40 is connected through impedance elements 44, 45, 46 and the connecting wires joining them to element 40 and to primary bridge 33, 41'. In the case of Fig. 10 these connecting means are simplified into the wires that form the common junction 70 between elements 38 and 40 and the wires 71 and 72 which join these elements to primary bridge 33, 41'.

The next common basic feature of all the embodiments is the provision of means for effecting a predetermined contribution of one or more of the secondary impedance means to the overall output of the impedance bridge network. Thus, in Fig. 8, I provide a voltage divider 47 having a voltage dividing contact which is connected to one output terminal 73 so that I can adjustably predetermine the contribution of element 40 to the overall output. Similarly, I provide voltage divider 51, the dividing contact of which is connected to the other output terminal 74 so that I can adjustably predetermine the contribution of element 38 to the overall output.

In the case of Fig. 10, I predetermine the contributions of elements 38 and 40 by means of shunt 52, junction point 70 serving as one output terminal of the bridge network and junction 75 being the other output terminal. As explained above, I can perform this predetermining function by applying individual shunts around one or both of elements 38 and 40 so that their contributions to the overall output can be predetermined independently of each other.

Finally, I provide means responsive to the output of the bridge network. Such means are indicated in the various figures such as indicator 44 of Fig. 8. The responsive means can, of course, be any of a wide variety of conventional devices such as null indicators, deflection indicators, recorders, printers, controllers, etc.

In the case of the embodiment illustrated in Fig. 11, the impedance bridge network referred to is made up of elements 33, 41, 41', 42 which is energized from power source 54 through its input terminals. The plurality of the impedance elements are here shown as 38, 40 and the means for connecting these impedance elements to the bridge network comprise impedance elements $R^1$, $R^2$, 56, 56', 57, 57' and the connections leading to the output terminals of primary bridge 33, 41, 41', 42. The means for effecting a predetermined contribution of the secondary impedance means is voltage divider 47 in combination with auxiliary power source 55. The overall output of the network is measured by responsive means 44. Fundamentally this broad relationship exists in the sub-combination per se of the right hand bridge of Fig. 11.

While I have throughout the above disclosure generally referred to "temperature" compensation and "temperature responsive elements," it will readily be seen that the compensation can be effected by elements which are responsive to conditions other than temperature. By way of example, in Fig. 8 the main bridge 33, 41, 41', 42 may be responsive to load while element 38 of the compensation bridge-within-a-bridge may be responsive to the atmospheric pressure, so that the response of a hermetically sealed load cell such as that shown in Fig. 7 can be compensated against the "false loading" on the cell produced by changes in atmospheric pressure acting on diaphragm 36. Also, it may be desired to combine temperature compensation with such a pressure compensation, using the principles of multiple compensation set forth above.

It will, of course, be understood that various changes in details of construction and arrangement of parts may be made by those skilled in the art without departing from the spirit of the invention as set forth in the appended claims.

I claim:

1. A modified Wheatstone bridge network having as its arms four impedance elements at least one of which is responsive to a primary condition and having two power input and two output terminals, a source of power connected to said power input terminals for energizing said network, a voltage divider responsive to a secondary condition and having two bridge connecting terminals and one voltage dividing terminal, said voltage divider including a plurality of secondary impedance means each respectively electrically responsive to a given secondary condition and being adapted to vary the division of the voltage appearing across its bridge connecting terminals in response to said secondary condition as a result of the response of said secondary impedance means, said bridge connecting terminals being interposed between and connected to two adjacent arms of said modified Wheatstone bridge network with said voltage dividing terminal serving as one of said output terminals so that the overall output of said bridge network is responsive to all of said primary and secondary conditions, means included in said voltage divider for effecting a predetermined contribution of at least one of said secondary impedance means to the overall output, and means connected to said output terminals and adapted to be responsive to said overall output of said bridge network.

2. The combination set forth in claim 1 further characterized in that the means for effecting a predetermined contribution comprises an electrical impedance shunting element connected in parallel with said one of said secondary impedance means.

3. The combination set forth in claim 1 further characterized in that the voltage dividing terminal of said voltage divider comprises an adjustable voltage dividing contact whereby the predetermined contribution of said secondary impedance can be adjustably made.

4. The combination set forth in claim 1 further characterized in that said voltage divider comprises two of said secondary impedance means connected in series with their common terminal serving as said voltage dividing terminal, the remaining two terminals of said two secondary impedance means serving as said bridge connecting terminals, and further characterized by the provision of electrical impedance shunting means connected across said bridge connecting terminals whereby said shunting means effects a predetermined contribution of both of said two secondary impedance means to the overall output.

References Cited in the file of this patent
UNITED STATES PATENTS
2,173,233    Lieneweg _____ Sept. 19, 1939